(12) United States Patent
Inai et al.

(10) Patent No.: US 7,563,528 B2
(45) Date of Patent: Jul. 21, 2009

(54) FUEL CELL SYSTEM AND METHOD OF SCAVENGING SAME

(75) Inventors: Shigeru Inai, Saitama (JP); Katsumi Hayashi, Saitama (JP); Hiromichi Yoshida, Saitama (JP); Hideo Kato, Saitama (JP); Ryo Jinba, Saitama (JP); Nobuyuki Matsumoto, Saitama (JP); Tomoki Kobayashi, Saitama (JP); Yasunori Kotani, Saitama (JP); Minoru Uoshima, Saitama (JP); Yoshikazu Murakami, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 205 days.

(21) Appl. No.: 11/071,678

(22) Filed: Mar. 2, 2005

(65) Prior Publication Data
US 2005/0196654 A1 Sep. 8, 2005

(30) Foreign Application Priority Data
Mar. 2, 2004 (JP) ............................. 2004-057059

(51) Int. Cl.
*H01M 8/00* (2006.01)
*H01M 8/04* (2006.01)
*H01M 8/12* (2006.01)

(52) U.S. Cl. .......................................... 429/22; 429/12

(58) Field of Classification Search ................... 429/22, 429/12
See application file for complete search history.

(56) References Cited

U.S. PATENT DOCUMENTS 7,141,326 B2 * 11/2006 Kobayashi et al. ............ 429/24

FOREIGN PATENT DOCUMENTS

| JP | 2003-331893 | 11/2003 |
| JP | 2003331893 A * | 11/2003 |

* cited by examiner

*Primary Examiner*—Mark Ruthkosky
*Assistant Examiner*—Karie O'Neill
(74) *Attorney, Agent, or Firm*—Lahive & Cockfield, LLP; Anthony A. Laurentano

(57) ABSTRACT

A fuel cell system includes a fuel cell, an oxidant gas passage, a cathode off-gas passage, a fuel gas passage, a circulation passage, an anode off-gas passage, a fuel shutoff valve, a supply device, a humidifier and a control device. The supply device supplies a scavenging gas, which is for scavenging the fuel cell, to the anode and the cathode. The humidifier humidifies the scavenging gas. The control device controls the supply device when the fuel cell is turned off so that supply of the fuel gas to the anode is shut off and the scavenging gas is supplied to the anode and the cathode, wherein supply of the scavenging gas to the cathode is conducted through the humidifier.

3 Claims, 5 Drawing Sheets

FIG.3

| | Scavenging | |
|---|---|---|
| | Dry | Wet |
| Time | ● | × |
| Amount | ● | × |
| Power generation | × | ● |

● Good
× Poor

FIG.4

| | Scavenging |
|---|---|
| | Dry/Wet |
| Time | ● |
| Amount | ● |
| Power generation | ● |

● Good
× Poor

History of current and voltage for dry scavenging

Distribution of cell voltages

History of current and voltage for dry/wet scavenging

Distribution of cell voltages

FUEL CELL SYSTEM AND METHOD OF SCAVENGING SAME

BACKGROUND OF THE INVENTION

The present invention relates to a fuel cell system and, more particularly, to a fuel cell system and method which are able to prevent a reduction in power generation during starting of a fuel cell under low temperature conditions.

It has been known that scavenging is conducted by supplying a scavenging gas to a fuel cell while it stops power generation so that it can be not only restarted easily but also prevented from experiencing damage and degradation due to freezing of moisture, when it is used under cold conditions (below freezing point).

Japanese Published Patent Application JP2003-331893 discloses a method for supplying a scavenging gas bypassing a humidifier so that its humidity shifts to lower side. The reason for introducing this method is that when an oxidant gas or fuel gas is supplied to the fuel cell, the gas will be humidified by the humidifier provided in a gas passage.

However, this method has a drawback that when scavenging has been completed within the fuel cell, it has an adverse effect on power generation due to unevenness of humidity within electrodes. The unevenness is ascribed to the fact that the scavenging gas, which is a dry gas, tends to intensively dehumidify the vicinity of an inlet while it is flowing through the fuel cell.

SUMMARY OF THE INVENTION

The present invention seeks to provide a fuel cell system and method which are able to scavenge a fuel cell when power generation is terminated so that it is possible to restart the fuel cell without reducing its power generation under low temperature conditions.

It is an aspect of the present invention to provide a fuel cell system, which comprises a fuel cell, an oxidant gas passage, a cathode off-gas passage, a fuel gas passage, a circulation passage, an anode off-gas passage, a fuel shutoff valve, a supply device, a humidifier and a control device. The fuel cell, which has a cathode and an anode, generates power with an oxidant gas supplied to the cathode and a fuel gas supplied to the anode. The oxidant gas passage supplies the oxidant gas to the cathode. The cathode off-gas passage discharges a cathode off-gas of the cathode. The fuel gas passage supplies the fuel gas to the anode. The circulation passage circulates an anode off-gas to the anode. The anode off-gas passage discharges the anode off-gas. The fuel shutoff valve shuts off supply of the fuel gas to the fuel gas passage. The supply device supplies a scavenging gas, which is for scavenging the fuel cell, to the anode and the cathode. The humidifier humidifies the scavenging gas. The control device controls the supply device when the fuel cell is turned off so that supply of the fuel gas to the anode is shut off and the scavenging gas is supplied to the anode and the cathode, wherein supply of the scavenging gas to the cathode is conducted through the humidifier.

The system described above is able to provide not only a quick scavenging to the anode where water tends to accumulate, but also a protection against reduction in power generation under low temperature conditions as a result of protecting electrolytic membranes by maintaining the humidity within electrodes, which is given by supply of the humidified scavenging gas to the cathode where water does not tend to accumulate.

It is another aspect of the present invention to provide a fuel cell system, in which the humidifier is connected to the oxidant gas passage. The humidifier further comprises a communicating passage and a communication shutoff valve provided in the communicating passage. The communicating passage provides fluid communication between an upstream of the oxidant gas passage relative to the humidifier and a downstream of the fuel gas passage relative to the fuel shutoff valve. The scavenging gas is air, which comprises oxygen and is used as the oxidant gas. The control device opens the communication shutoff valve so as to supply the scavenging gas to the anode.

The system described above, which selects one of fluid communication and shutoff for the communication passage, is able to supply the air of oxidant gas without humidification to the anode. Because the system uses the air as a scavenging gas, it offers an advantage of simple configuration.

BRIEF DESCRIPTION OF THE DRAWINGS

FIG. 3 is a table summarizing results of scavenging when one of dry and wet methods alone is applied to both cathode and anode.

FIG. 4 is a table summarizing results of scavenging, which applies both dry and wet methods, wet to cathode and dry to anode.

DESCRIPTION OF THE PREFERRED EMBODIMENTS

Before entering into detailed discussion, brief description is given of conditions of electrodes while a fuel cell system is generating power.

It is generally regarded as preferable that scavenging of a fuel cell should be conducted in a short period of time. This leads to an idea that discharging of water is conducted efficiently with a dry gas which bypasses a humidifier. However, as described above, if this idea is put into practice, a problem will arise which is related to a reduction in power generation due to excessive dehumidification of moisture.

It has been generally practiced that pure hydrogen is supplied to an anode and air to a cathode in a fuel cell, which is regarded as a promising power source for a vehicle. Because in this case the stoichiometry of hydrogen is determined as low as possible in consideration of fuel consumption and performance associated with power generation, the amount of gas supplied to the anode will decrease. On the other hand, the cathode, which is provided with a large amount of air so that an amount of oxygen required for power generation can be securely supplied, receives simultaneously a large amount of nitrogen, which does not contribute to power generation.

Furthermore, the stoichiometry of air at the cathode, which has closely related to power generation, is determined to be greater than that of hydrogen at the anode. This also leads to a difference in an amount of supplied gas between the anode and the cathode. In addition, the following differences should be noted. The gas viscosity of air is more than two times as large as that of hydrogen. The hydrogen is circulated so as to be recycled. On the other hand, the air, which is continuously taken from the outside air without circulation, is supplied to a fuel cell. These differences amount to creation of opposite environments for the anode and the cathode. The water produced during power generation tends to accumulate at the anode, but does not at the cathode.

In this way, when scavenging is conducted in preparation for starting of a fuel cell under low temperature conditions when power generation is stopped, the anode and the cathode differ in requirements for scavenging.

A fuel cell system according to an embodiment of the present invention, which scavenges electrodes with gasses of different humidity, dry air for the anode and humidified air for the cathode, is able not only to decrease a period of time for scavenging but also to prevent degradation of power generation during start of a fuel cell under low temperature conditions.

The embodiment of the present invention is now described with reference to the accompanying drawings. In this embodiment, description is given of a fuel cell system for an electric vehicle, for example.

Figure 1:
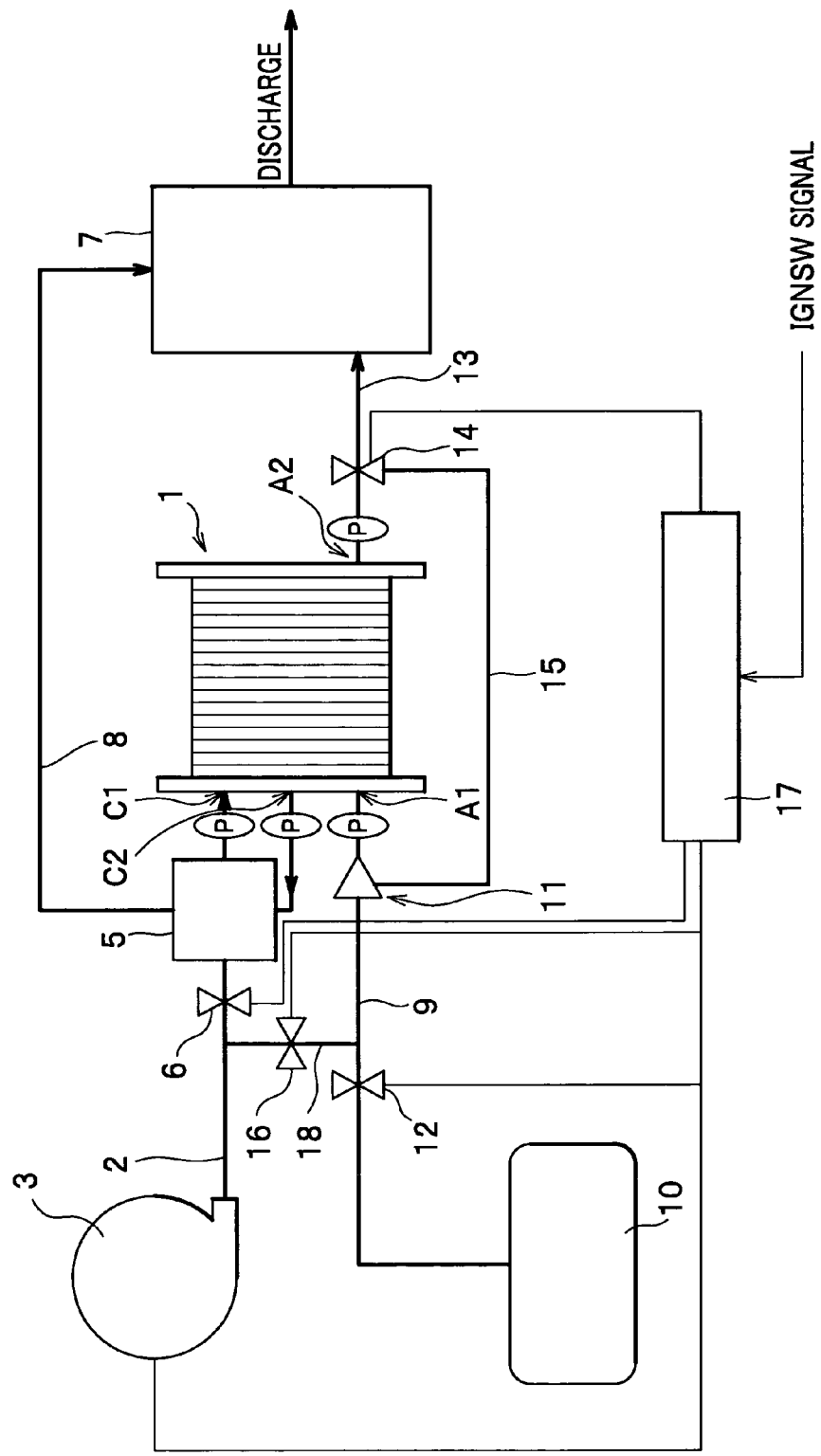
FIG. 1 is a schematic diagram illustrating a fuel cell system mounted on an electric vehicle.

FIG. 1 is a schematic diagram illustrating a fuel cell system mounted on an electric vehicle.

A fuel cell 1 comprises stacked cells, each of which has an electrolytic membrane interposed between a cathode and an anode.

An air passage (oxidant gas passage) 2 is connected to an inlet C1, so that a supercharger 3 is able to supply air to the cathode via the air passage 2. The air passage 2 has an air shutoff valve 6, which controls supply and shutoff of air, and a humidifier 5, which humidifies the supplied air. The supercharger 3 and the air shutoff valve 6 are controlled by a control device 17.

An oxidant off-gas passage (cathode off-gas passage) 8 is connected to an outlet C2 of the cathode. The oxidant off-gas passage 8 connects a dilution box 7 and the humidifier 5.

The air supplied by the supercharger 3 is humidified by the humidifier 5 and supplied to the cathode. The air, which experiences an electrochemical reaction with a hydrogen gas supplied to the anode, becomes an exhaust gas, being discharged from the dilution box 7 via the oxidant off-gas passage 8. When the exhaust gas passes through the humidifier 5, its moisture is collected by the humidifier 5 and recycled for humidification of the air. When scavenging is conducted, the air humidified by the humidifier 5 is supplied to the cathode.

A hydrogen gas passage (fuel gas passage) 9 is connected to an inlet A1 of the anode of the fuel cell 1. A hydrogen gas is supplied to the anode from a hydrogen tank 10 via the hydrogen gas passage 9. The hydrogen tank 10 stores a highly pressurized hydrogen gas of 35 MPa, for example. The hydrogen gas passage 9 has an ejector 11 on a closer side of the fuel cell 1 and a fuel shutoff valve 12 for shutting off a fuel gas on a closer side of the hydrogen tank 10. This fuel shutoff valve 12 controls supply and shutoff of hydrogen gas for the anode.

The ejector 11 pressurizes the hydrogen gas coming through a circulation passage 15, circulating it to the anode.

A fuel off-gas passage (anode off-gas passage) 13 is connected to an outlet A2 of the anode of the fuel cell 1. A three way valve 14 is connected to the fuel off-gas passage 13. By switching the three way valve 14, it is possible to discharge an unreacted hydrogen gas remaining in the cathode, selecting one of the circulation passage 15 and the dilution box 7.

The three way valve 14 is controlled by the control device 17.

When the fuel shutoff valve 12 is opened by the control device 17 for power generation, a highly pressurized hydrogen gas stored in the hydrogen tank 10 is depressurized by a pressure reducing valve (not shown) and supplied to the anode of the fuel cell 1. This hydrogen gas at the anode and the air supplied to the cathode make an electrochemical reaction, generating power. The unreacted hydrogen gas is circulated as an exhaust gas to the fuel cell 1 by the ejector 11 via the three way valve 14 and the circulation passage 15.

Because the air from the supercharger 3 which is humidified by the humidifier 5 is supplied to the cathode of the fuel cell 1 during power generation, the humidity within electrodes does not decrease after power generation starts, which keeps desirable power generation.

In this connection, the stoichiometry of air is determined to be greater than that of hydrogen gas so as to conduct stable power generation.

An upstream of the air passage 2 relative to the air shutoff valve 6 and a downstream of the hydrogen gas passage 9 relative to the fuel shutoff valve 12 are connected by a communicating passage 18 so that the anode can be scavenged by the air supplied by the supercharger 3. The communicating passage 18 has a communication shutoff valve 16, which is controlled by the control device 17.

In this way, it is possible to supply the air from the supercharger 3 to the anode of the fuel cell 1, bypassing the humidifier 5. This means that it is possible to supply not only humidified air to the cathode but also dry air to the anode during scavenging.

A group of components, including the air passage (oxidant gas passage) 2, supercharger 3, hydrogen gas passage (fuel gas passage) 9 and communicating passage 18, forms a supply device.

Next, description is given of a method, which a fuel cell system according to the present invention introduces, when power generation is terminated, giving care to subsequent starting of a fuel cell 1 under low temperature conditions.

Figure 2:
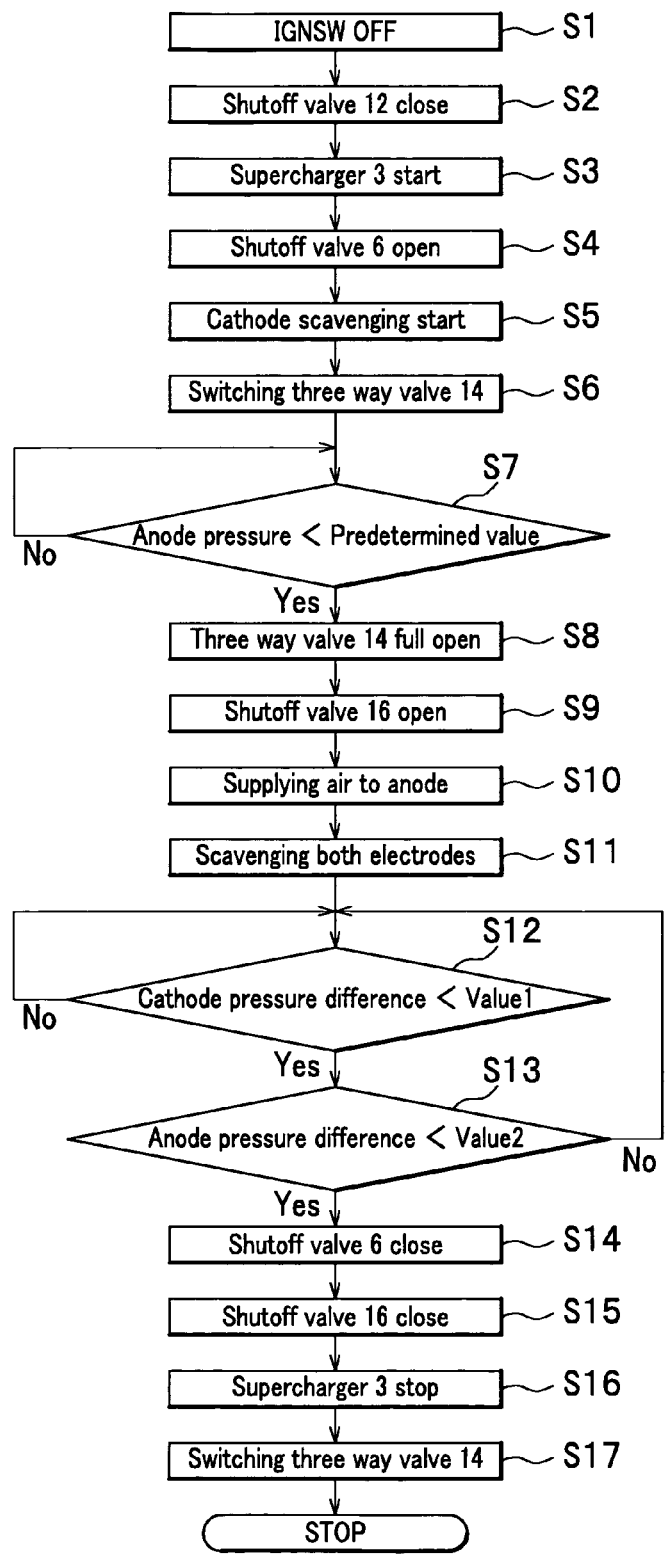
FIG. 2 is a flow chart showing how a fuel cell system works when power generation is stopped.

FIG. 2 is a flow chart showing how the fuel cell system works when power generation is terminated.

When an ignition switch of a vehicle is turned off, an OFF signal enters a control device 17 (step S1). Receiving this OFF signal, the control device 17 closes a fuel shutoff valve 12 (step S2). Accordingly, supply of hydrogen gas to the fuel cell 1 is cut off and power generation of the fuel cell 1 is terminated. A supercharger 3, which is driven by a battery onboard the vehicle, is brought to a stop when the ignition switch is turned off.

After power generation is terminated, the control device 17 starts the supercharger 3 (step S3) and opens an air shutoff valve 6 (step S4) so as to supply a scavenging gas to a cathode. These steps are intended to provide prevention against a reduction in power generation, easier starting and protection for the fuel cell 1 during low temperature conditions. In this way, air humidified by a humidifier 5 is supplied to the cathode of fuel cell 1, thereby starting scavenging of the cathode (step S5).

The control device 17 subsequently switches a three way valve 14 so as to conduct scavenging for an anode (step S6). As a result of switching the three way valve 14, an unreacted hydrogen gas within the anode is discharged into a dilution box 7. In this connection, the control device 17 controls the three way valve 14 so that it does not fully open in order to prevent a steep pressure drop.

The control device 17 determines whether or not a pressure of the anode is less than a predetermined value based on a signal generated by a pressure sensor P, which is located in a fuel off-gas passage 13 (step S7).

If the pressure of anode is not less than the predetermined value (No in step S7), judgment in step S7 is repeated.

If the pressure of anode is less than the predetermined value (Yes in step S7), the control device 17 fully opens the three way valve 14 (step S8). In this way, prerequisite steps for supplying the scavenging gas to the anode have been completed.

Subsequently, the control device 17 opens a communication shutoff valve 16 so that the air sent by the supercharger 3 is supplied to the anode of the fuel cell 1 (step S9). The air is thus supplied to the anode (step S10), starting scavenging of the anode. It should be noted that because the air is not humidified, the anode is scavenged by a dry gas different from the cathode.

Scavenging is conducted for the cathode and the anode in different manners: the cathode with humidified air and the anode with dry air (step S11).

The control device 17 determines completion of scavenging based on a pressure difference between an inlet and an outlet of each of the cathode and the anode. Receiving data signals generated by pressure sensors P located at an inlet C1 and an outlet C2 of the cathode, the control device 17 determines whether or not a pressure difference obtained from the signals is less than a predetermined value 1 (step S12). If the pressure difference is not less than the predetermined value 1 (No in step S12), the control device 17 receives new signals and executes another determination.

If the pressure difference is less than the predetermined value 1 (Yes in step S12), the control device 17 receives signals generated by pressure sensors P located at an inlet A1 and an outlet A2, determining whether or not a pressure difference obtained from the signals is less than a predetermined value 2 (step S13).

If the pressure difference is not less than the predetermined value 2 (No in step S13), the control device 17 determines that scavenging is not completed, thereby directing the flow back to step S12. After execution of step S12, the control device 17 receives new signals and executes another determination on a pressure difference between the inlet A1 and the outlet A2 of the anode.

If the pressure difference is less than the predetermined value 2 (Yes in step S13), the control device 17 determines that scavenging is completed, and closes the air shutoff valve 6 (step S14) and the communication shutoff valve 16 (step S15). In this way, supply of air to the cathode and the anode is terminated, which completes scavenging.

Subsequently, the control device 17 stops the supercharger 3 (step S16) and switches the three way valve 14 so that the hydrogen gas within the anode is in fluid communication with a circulation passage 15 (step S17). This brings the fuel cell 1 to a stop.

As described above, the present invention provides scavenging to electrodes in appropriate manners when power generation of the fuel cell 1 is stopped. The scavenging is done by supplying air to the cathode and the anode in different manners. More specifically speaking, it is done by supplying air humidified by the humidifier 5 to the cathode, in which water does not tend to accumulate, but dry air to the anode, in which water tends to accumulate.

Advantages of the present invention are understood by a comparison with dry scavenging and wet scavenging shown in FIG. 3. The dry scavenging is a method which applies a dry gas alone to both cathode and anode. The wet scavenging, on the other hand, uses only a humidified gas. As shown in FIG. 4, the embodiment of the present invention, which selectively applies dry and wet scavenging according to electrodes, is able to provide better power generation, because it prevents excessive dehumidification in the electrodes. Compared with wet scavenging, the present invention can provide a better amount of scavenging and less period of time required for scavenging. In this connection, a better amount of scavenging is meant to indicate that less energy is required for scavenging in order to maintain performance in terms of power generation.

A comparison is made for characteristics of power generation between the present invention and a method which applies dry scavenging alone to both electrodes.

The same temperature of outside air and the same generated current are assumed for both cases. It is also assumed that it has lapsed sufficient time after power generation of a fuel cell system was terminated.

Figure 5:
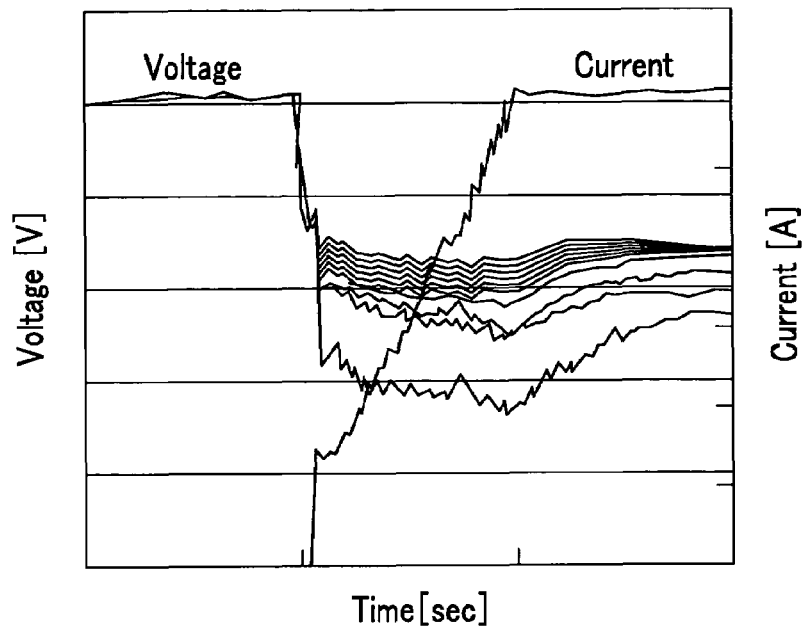
FIG. 5 shows history of current and voltage after power generation is started for a fuel cell in the case of dry scavenging alone for both cathode and anode.

FIG. 5 shows history of current and voltage after power generation is started for a fuel cell in the case of dry scavenging for both cathode and anode.

Figure 6:
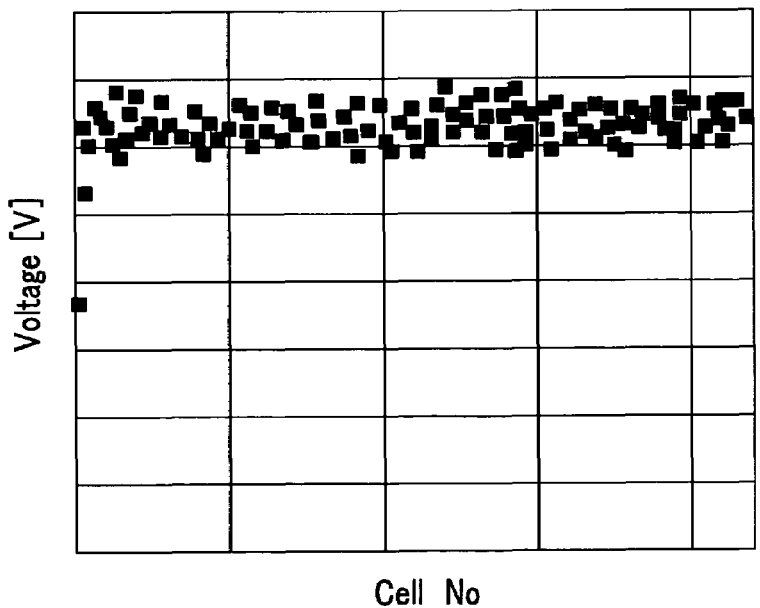
FIG. 6 shows a distribution of voltages of respective cells at an instance in the case of dry scavenging alone for both cathode and anode.

FIG. 6 shows a distribution of voltages of respective cells at an instance in the case of dry scavenging for both cathode and anode.

Figure 7:
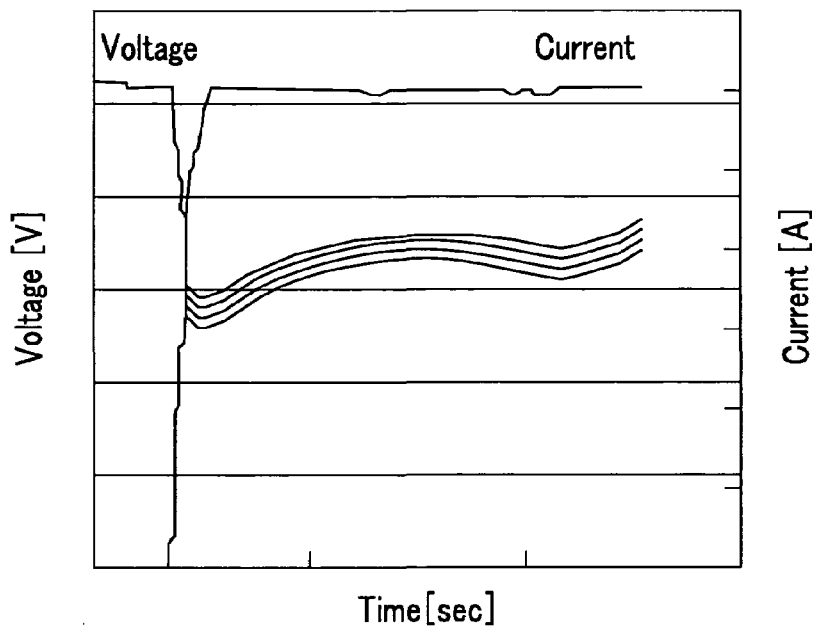
FIG. 7 shows history of current and voltage after power generation is started for a fuel cell in the case of the present invention, which selectively uses dry and wet scavenging according to electrodes.

FIG. 7 shows history of current and voltage after power generation is started for a fuel cell in the case of the present invention, which selectively uses dry and wet scavenging according to electrodes.

Figure 8:
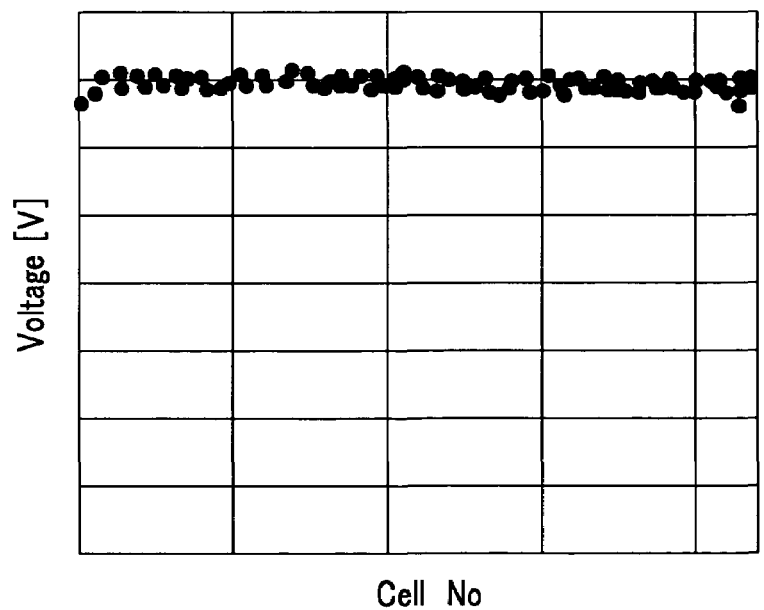
FIG. 8 shows a distribution of voltages of respective cells at an instance in the case of the present invention.

FIG. 8 shows a distribution of voltages of respective cells at an instance in the case of the present invention.

When dry scavenging alone is applied to both cathode and anode, as shown in FIG. 5, it takes longer time for current to reach a maximum value because it gradually increases before reaching the maximum value after starting of power generation. While a fuel cell is generating power, its cell voltages generally fall in a certain range of voltage. However, some cells show remarkably low voltages, which depart from those of other cells.

As shown in FIG. 6, although a distribution of cell voltages at an instance falls in a relatively narrow range, there are some exceptions, which behave differently from other cells to show significantly lower voltages.

As shown in FIG. 7, in a fuel cell system of the present invention, which selectively employs dry and wet scavenging according to electrodes, its fuel cell is able to reach a maximum current in a shorter period of time. In this way, it is known in comparison with FIG. 5 that the fuel cell of the present invention has a better power generation. In this connection, voltages of cells, which vary as power generation proceeds, tend to substantially uniformly vary and fall in a narrow range. This also demonstrates that the fuel cell system according to the present invention provides a better power generation.

As shown in FIG. 8, distribution of cell voltages at an instance according to the present invention shows better uniformity without an exception in contrast to FIG. 6, which supports advantages of the present invention described above.

Therefore, the present invention, which selectively applies dry and wet scavenging according to electrodes, is able to provide not only protection against degradation of power generation during starting of a fuel cell under low temperature conditions, but also a reduction in period of time required for scavenging while power generation is stopped. These advantages allow not only improvement in starting of a fuel cell under low temperature conditions, but also earlier turning-off of a power system when a vehicle is brought to a stop.

While the invention has been described in detail and with reference to a specific embodiment thereof, it will be apparent to one skilled in the art that various changes and modifications can be made therein without departing from the spirit and scope thereof. For example, a fuel cell system according to the present invention, which is applied to a vehicle in the embodiment described above, can be used as other fuel cell systems which are required to start under low temperature conditions.

Foreign priority document, JP 2004-057059 filed on Mar. 2, 2004, is hereby incorporated by reference.

What is claimed is:

1. A fuel cell system comprising:
    a fuel cell having a cathode and an anode, the fuel cell generating power with an oxidant gas supplied to the cathode and a fuel gas supplied to the anode;
    an oxidant gas passage for supplying the oxidant gas to the cathode;
    a cathode off-gas passage for discharging a cathode off-gas of the cathode;
    a fuel gas passage for supplying the fuel gas to the anode, said fuel gas passage being free of a humidifier;
    a circulation passage for circulating an anode off-gas to the anode;
    an anode off-gas passage for discharging the anode off-gas;
    a fuel shutoff valve for shutting off supply of the fuel gas to the fuel gas passage;
    a supply device for supplying a scavenging gas, which is for scavenging the fuel cell, to the anode and the cathode;
    a humidifier disposed in the oxidant gas passage for humidifying the scavenging gas; and
    a control device programmed to control the supply device when the fuel cell is turned off by:
        switching the fuel shutoff valve to shut off the fuel gas supplied to the anode;
        supplying the scavenging gas from the supply device to the cathode, wherein the scavenging gas supplied to the cathode is conducted through the humidifier; and
        supplying the scavenging gas from the supply device to the anode, wherein the scavenging gas supplied to the anode bypasses the humidifier.

2. A fuel cell system according to claim 1 wherein the humidifier is connected to the oxidant gas passage, the humidifier further comprising:
    a communicating passage for providing fluid communication between an upstream of the oxidant gas passage relative to the humidifier and a downstream of the fuel gas passage relative to the fuel shutoff valve; and
    a communication shutoff valve provided in the communicating passage;
    wherein the scavenging gas is air which comprises oxygen and is used as the oxidant gas, and the control device opens the communication shutoff valve so as to supply the scavenging gas to the anode.

3. A method for scavenging a fuel cell system, which comprises a fuel cell, an oxidant gas passage, a cathode off-gas passage, a fuel gas passage, a circulation passage, an anode off-gas passage, a fuel shutoff valve, a supply device, a humidifier and a control device, the method comprising the steps of:
    supplying an oxidant gas to a cathode of the fuel cell via the oxidant gas passage;
    discharging a cathode off-gas of the cathode via the cathode off-gas passage;
    supplying a fuel gas to an anode of the fuel cell via the fuel gas passage;
    circulating an anode off-gas to the anode via the circulation passage;
    discharging the anode off-gas via the anode off-gas passage;
    shutting off supply of the fuel gas to the fuel gas passage with the fuel shutoff valve;
    supplying a scavenging gas, which is for scavenging the fuel cell, to the anode and the cathode with the supply device; and
    controlling the scavenging gas to the cathode with the control device when the fuel cell is turned off so that the scavenging gas to the cathode passes through the humidifier; and
    controlling the scavenging gas supplied to the anode with the control device when the fuel cell is turned off so that the scavenging gas supplied to the anode bypasses the humidifier.

* * * * *